United States Patent
Milby

(10) Patent No.: US 7,480,670 B1
(45) Date of Patent: Jan. 20, 2009

(54) ACTIVATION OF NATIVE OPERATIONS FOR DISTINCT-USER DEFINED TYPES

(75) Inventor: Gregory Howard Milby, San Marcos, CA (US)

(73) Assignee: Teradata US, Inc., Miamisburg, OH (US)

(*) Notice: Subject to any disclaimer, the term of this patent is extended or adjusted under 35 U.S.C. 154(b) by 348 days.

(21) Appl. No.: 10/804,793

(22) Filed: Mar. 19, 2004

(51) Int. Cl.
G06F 17/00 (2006.01)

(52) U.S. Cl. .................................. 707/102; 707/100
(58) Field of Classification Search .............. 707/1, 707/100, 3, 102
See application file for complete search history.

(56) References Cited

U.S. PATENT DOCUMENTS

| | | | |
|---|---|---|---|
| 7,379,927 B2* | 5/2008 | Cunningham et al. | 707/2 |
| 2004/0267766 A1* | 12/2004 | Marek et al. | 707/100 |
| 2005/0044530 A1* | 2/2005 | Novik | 717/122 |
| 2005/0177581 A1* | 8/2005 | Sezgin et al. | 707/100 |
| 2005/0177589 A1* | 8/2005 | Venkatesh et al. | 707/102 |
| 2006/0064412 A1* | 3/2006 | Cunningham et al. | 707/3 |

OTHER PUBLICATIONS

Bardin et al "Composable Ada Software Components and the Re-Export Paradigm", ACM SIGAda Ada Letters (archive) vol. VIII, Issue 1 (Jan./Feb. 1988), pp. 58-79.*

* cited by examiner

Primary Examiner—Uyen T. Le
(74) Attorney, Agent, or Firm—Howard Speight

(57) ABSTRACT

A method, computer program, and database system for controlling operations that may be performed on a user-defined type (UDT) are disclosed. The UDT is derived from an underlying type that has a set of underlying operations. The method includes creating the UDT and activating zero or more underlying operations for the UDT.

18 Claims, 5 Drawing Sheets

US 7,480,670 B1

ACTIVATION OF NATIVE OPERATIONS FOR DISTINCT-USER DEFINED TYPES

BACKGROUND

The ANSI SQL:1999 standard introduced support for distinct and structured user-defined types (UDTs). The standard enables developers of distinct and structured UDTs to define the behavior of the types with respect to type comparisons, casting functionality, and transforms (i.e. input and output formatting).

SUMMARY

In general, in one aspect, the invention features a method of controlling operations that may be performed on a user-defined type (UDT) in a database system. The UDT is derived from an underlying type that has a set of underlying operations. The method includes creating the UDT and activating zero or more underlying operations for the UDT.

Implementations of the invention may include one or more of the following. The UDT may be a distinct data type. Creating the UDT may include accepting a CREATE TYPE query. The CREATE TYPE query may include a system operators clause. The system operators clause may include an operator list, which may include zero or more operator elements, where each operator element corresponds to an underlying operation. Activating the underlying operations may include, for each operator element listed in the operator list, activating the corresponding underlying operation for the UDT. The operator list may include an ALL element. Activating the underlying operations may include activating all underlying operations for the UDT. Activating the underlying operations may include accepting an ALTER TYPE query that includes a system operators clause. The system operators clause may include an operator list. The operator list may include zero or more operator elements, where each operator element corresponds to an underlying operation. Activating the underlying operations may include, for each operator element listed in the operator list, activating the corresponding underlying operation for the UDT. Activating the underlying operations may include recording, in a data dictionary, the activated underlying operations for the UDT. One or more UDT columns may be adapted to store UDT values. The method may include accepting a query including a query operator that takes one or more operands, where one or more of the operands are UDT columns. The method may include determining whether the query operator is activated for the UDT of each UDT column, and if it is, performing the operation.

In general, in another aspect, the invention features a computer program, stored on a tangible storage medium, for use in controlling operations that may be performed on a user-defined type (UDT) in a database system. The UDT is derived from an underlying type that has a set of underlying operations. The computer program includes executable instructions that cause a computer to create the UDT and activate zero or more underlying operations for the UDT.

In general, in another aspect, the invention features a database system that includes a massively parallel processing system. The massively parallel processing system includes one or more nodes, a plurality of CPUs, each of the one or more nodes providing access to one or more CPUs, a plurality of data storage facilities, each of the one or more CPUs providing access to one or more data storage facilities, and a process for execution on the massively parallel processing system for controlling operations that may be performed on a user-defined type (UDT) in the database system. The UDT is derived from an underlying type that has a set of underlying operations. The process includes creating the UDT and activating zero or more underlying operations for the UDT.

DETAILED DESCRIPTION

Figure 1:
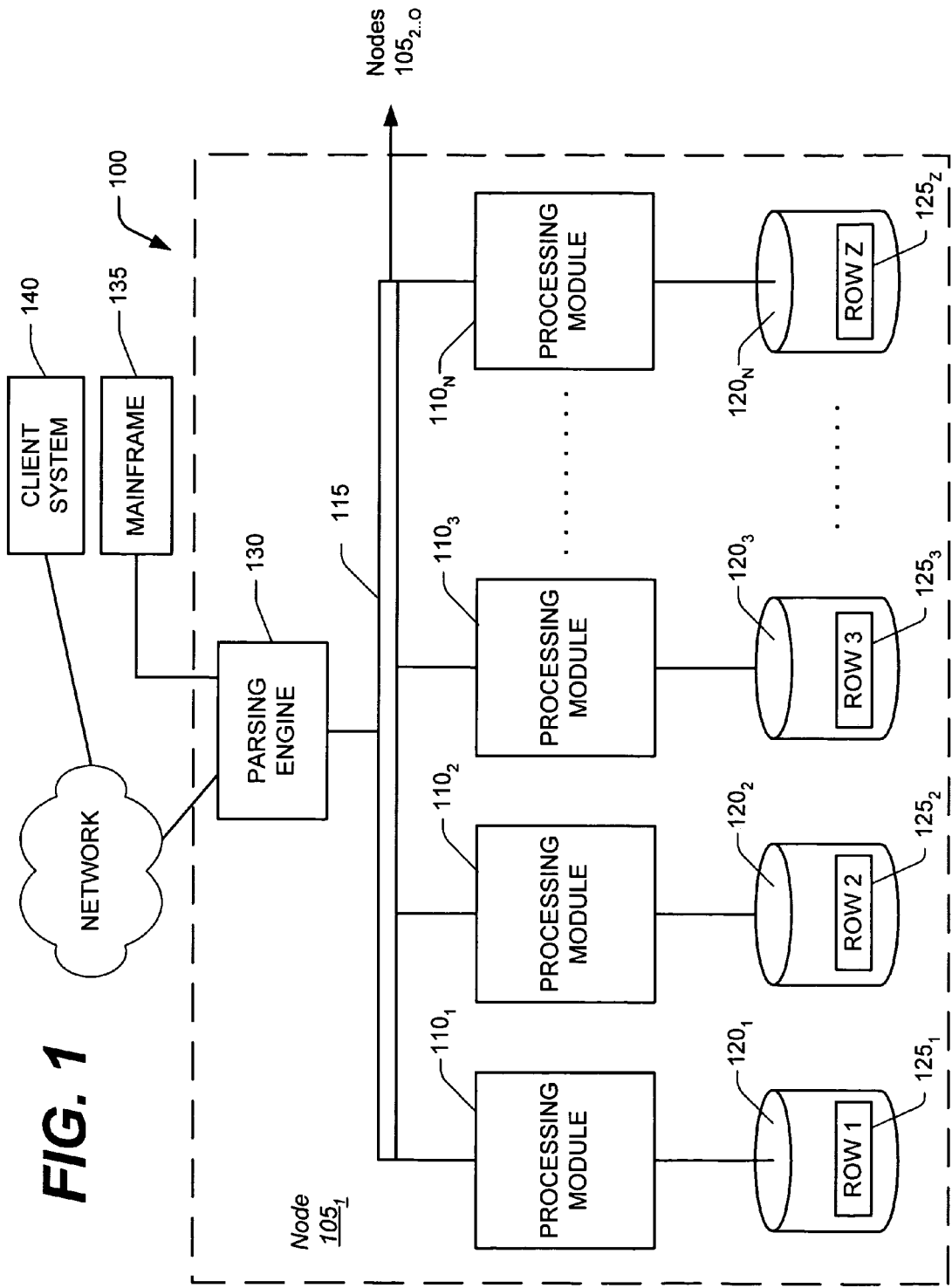
FIG. 1 is a block diagram of a node of a database system.

The techniques for statistically representing skewed data disclosed herein have particular application, but are not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
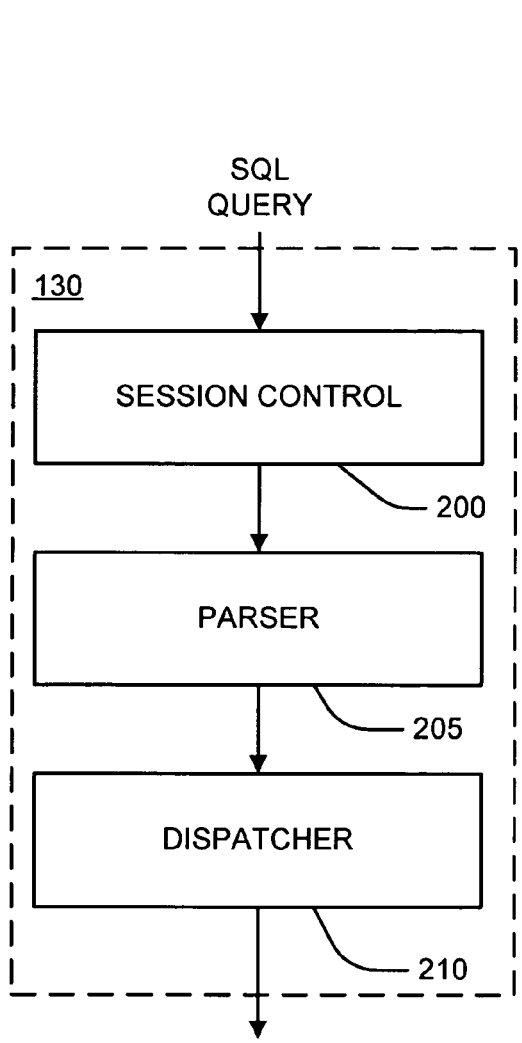
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
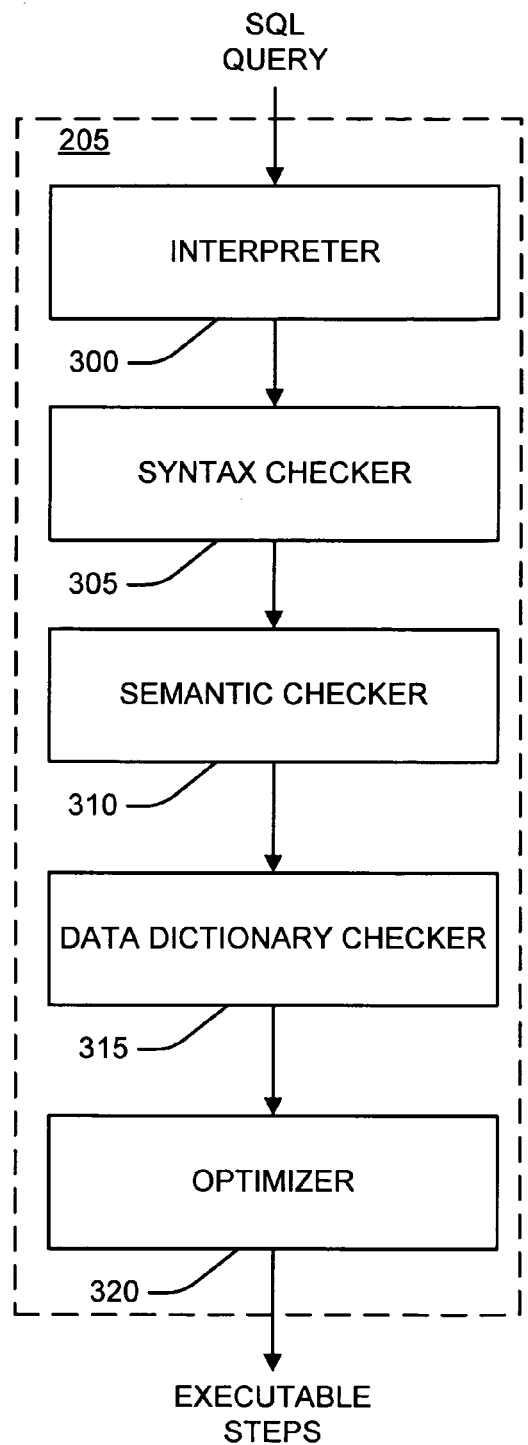
FIG. 3 is a flow chart a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
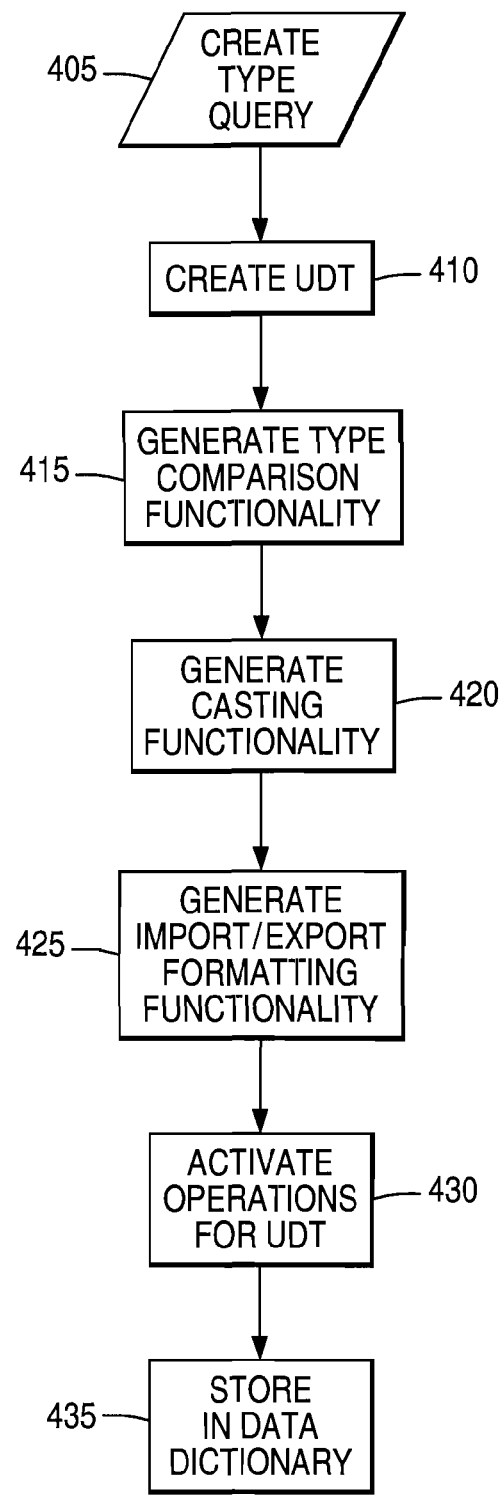
FIG. 4 is a flow chart of a system for creating a UDT.

FIG. 4 shows an example system for creating a UDT based on an underlying data type. In one example system where the UDT is based on a single underlying type, the UDT is called a distinct UDT. In general, the UDT is created with the following query:

CREATE TYPE <distinct type name>
 [AS <representation>]
 [<system operators clause>]
 [<reference type specification>]
 [<cast option>]
 [<method specification list>]

The bracketed clauses in the query are optional. One example system provides default functionality for clauses not specified in the CREATE TYPE query based on the type specified in the representation clause (e.g., the underlying-data type). For example, the system may receive the following query:

CREATE TYPE Euro AS DECIMAL(8,2);

The system receives the query (block 405), and in response, it creates a new UDT based on the underlying-data type DECIMAL(8,2) (block 410). The system generates the following default functionality for the Euro:

1. type comparison (e.g., the comparison of two Euro's behaves the same as the comparison of two DECIMAL (8,2)'s) (block 415);

2. casting functionality (e.g., Euro's may be cast into DECIMAL(8,2)'s and vice-versa) (block 420); and 3. import/export formatting (e.g., Euro's are imported or exported as DECIMAL(8,2)'s) (block 425).

In the example query above, no default functionality was specified for the system operators clause. In one implementation of the system, no underlying operations are activated for the Euro when the system operators clause is not specified. In other example queries, one or more underlying operations are enabled for the UDT with the following general syntax for the system operators clause:

<system operators clause> :: = OPERATORS <left paren> <operator list> <right paren> where the operator list has the following form:

<operator list> :: =ALL | { <operator element> [ { <comma> <operator element> } . . . ]}

Using "ALL" in the operator list enables all underlying operations for the UDT (e.g., all valid operators for the underlying type are enabled for the UDT). Other example operator lists specify one or more underlying operations. In response to such operator lists, the system enables the underlying operations enumerated in the operator list for the UDT.

For example, the system may receive the following query:

CREATE TYPE Euro AS DECIMAL(8,2) OPERATORS (+, −);

The system receives the query (block 405), creates the Euro UDT (block 410), and generates the default functionality described above (blocks 415-425). The system also enables the operations associated with the "+" and "−" underlying operators for the Euro UDT (block 430). In this example system, when a Euro is the operand of a "+" or "−" operator, the system treats each Euro operand as a DECIMAL(8,2).

In the example above the system enabled numeric operations for the UDT. In other examples, the system enables other operators or functions for the UDT. For example, consider the following query:

CREATE TYPE Name AS VARCHAR(40) OPERATORS (CONCAT, SUBSTRING);

The system receives the query (block 405), creates the Name UDT (block 410), and generates the default functionality described above (blocks 415-425). The system also enables the underlying operations associated with the "CONCAT" and "SUBSTRING" operators for the Name UDT (block 430). In this example system, when a Name is an argument to the "CONCAT" or "SUBSTRING" functions, the functions treat the Name as a VARCHAR(40).

In one example system, UDT definitions, including enabled underlying operations described by functions and operators, are stored in a data dictionary (block 435), allowing the system to add, retrieve, or modify UDT definitions.

Figure 5:
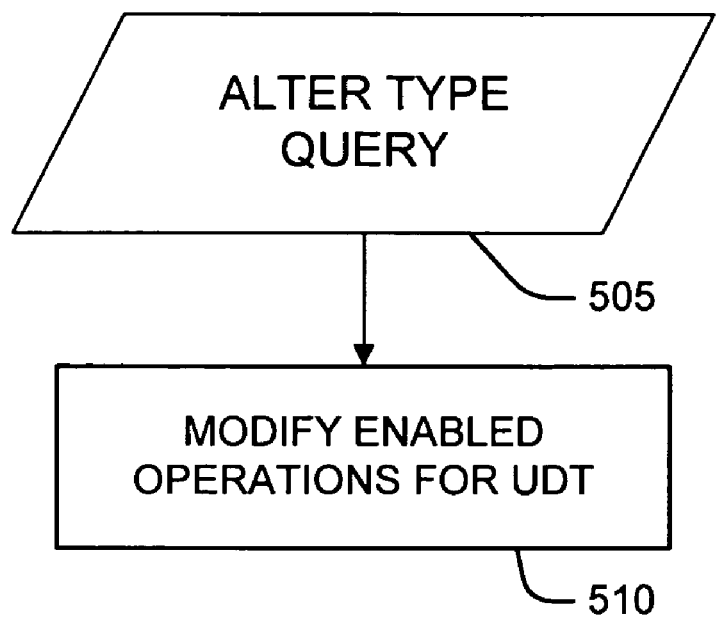
FIG. 5 is a flow chart of a system for modifying activated operators for a UDT.

In the examples above, underlying operators were enabled for UDTs using CREATE TYPE queries. In other implementations, the underlying operations may be enabled after the UDT is created. For example, the system in FIG. 5 alters the enabled underlying operators for a UDT. The system receives an ALTER TYPE query (block 505) and modifies the enabled operators for the UDT (block 510). An example query to modify the enabled underlying operations is:

ALTER TYPE Euro OPERATORS (+, −, *);

The system receives the query (block 505) and modifies the enabled underlying operations for the Euro UDT so that the operations associated with the "+," "−," and "*" operators are enabled and the other operators are disabled (block 510).

Figure 6:
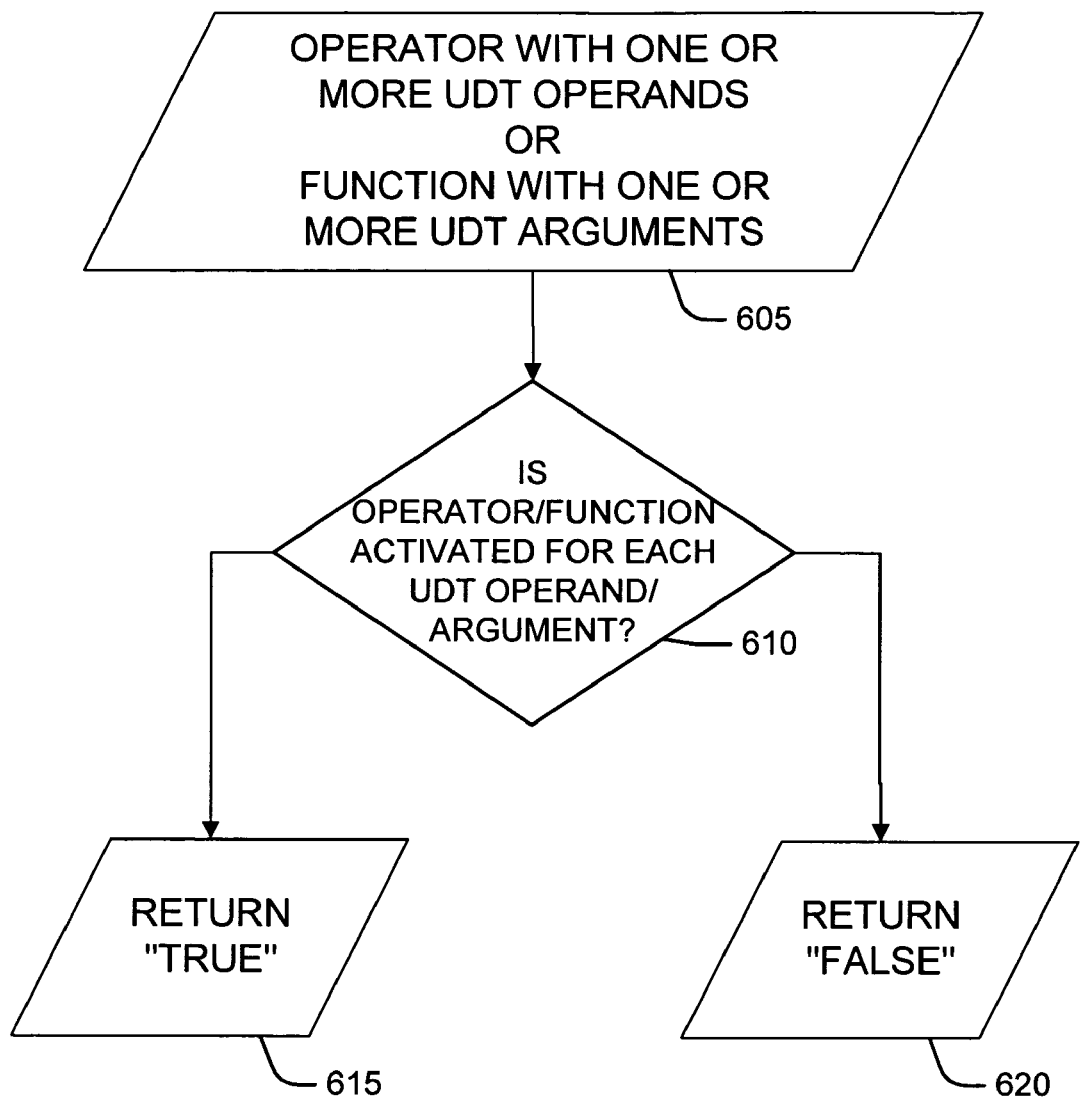
FIG. 6 is a flow chart of a system for determining whether a operator is activated.

In addition to creating and modifying UDTs, one example DBS 100 evaluates queries that include one or more operators with one or more UDT operands, or queries that include one or functions with one or more UDT arguments. An example system for determining if the operation is permitted for the UDT is shown in FIG. 6. The system receives an operator with one or more UDT operands or a function with one or more UDT arguments (block 605). The system then determines if the operator or function is activated for each UDT operand/argument (block 610). In one implementation, the system references the UDT definition in the data dictionary to determine if the operation represented by the operator or function is enabled for the UDT. If the operator or function is enabled for each UDT operand or argument, the system returns "TRUE" (block 615), otherwise the system returns "FALSE" (block 620).

For example, assume that an Orders table has the following definition:
CREATE TABLE Orders (ID INT, Subtotal Euro, Tax Euro);
and, further assume that the system receives the following query:
SELECT Subtotal+Tax FROM Orders where ID=1;

The system receives the "+" operator and two references to the Euro UDT (block 605). In certain implementations, the system receives only a single reference to a UDT that is used multiple times as an operand to an operator or as a argument to a function. The system determines if the operation associated with the "+" operator is enabled for the Euro UDT (block 610), and, because it is, the system returns "TRUE" (block 615).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of controlling operations performed on a user-defined type (UDT) in a database system, where the UDT is derived from an underlying type having a set of underlying operations, the method including:
   creating the UDT from the underlying type in the database system;
   selectively activating one or more underlying operations for the UDT; and
   recording, in a data dictionary, the activated underlying operations for the UDT.

2. The method of claim 1, where the UDT is a distinct data type.

3. The method of claim 1, where creating the UDT includes:
   accepting a CREATE TYPE query including a system operators clause including an operator list including one or more operator elements, where each operator element corresponds to an underlying operation;
   and where activating the underlying operations includes:
      for each operator element listed in the operator list:
         activating the corresponding underlying operation for the UDT.

4. The method of claim 3, where the operator list includes an ALL element, and where activating the underlying operations includes activating all underlying operations for the UDT.

5. The method of claim 1, where activating the underlying operations includes:
   accepting an ALTER TYPE query including a system operators clause including an operator list including one or more operator elements, where each operator element corresponds to an underlying operation; and
   for each operator element listed in the operator list:
      activating the corresponding underlying operation for the UDT.

6. The method of claim 1, where one or more UDT columns are adapted to store UDT values, the method including:
   accepting a query including a query operator that takes one or more operands, where one or more of the operands are UDT columns; and
   determining whether the query operator is activated for the UDT of each UDT column, and if it is, performing the operation.

7. A computer program in executable form, stored on a computer-readable tangible storage medium, for use in controlling operations performed on a user-defined type (UDT) in a database system, where the UDT is derived from an underlying type having a set of underlying operations, the computer program including executable instructions that cause a computer to:
   create the UDT from the underlying type in the database system;
   selectively activate one or more underlying operations for the UDT; and
   record, in a data dictionary, the activated underlying operations for the UDT.

8. The computer program of claim 7, where the UDT is a distinct data type.

9. The computer program of claim 7, where the executable instructions to create the UDT include executable instruction that cause the computer to:
   accept a CREATE TYPE query including a system operators clause including an operator list including one or more operator elements, where each operator element corresponds to an underlying operation;
   and where the executable instructions to activate the underlying operations include executable instruction that cause the computer to:
      for each operator element listed in the operator list:
         activate the corresponding underlying operation for the UDT.

10. The computer program of claim 9, where the operator list includes an ALL element, and where the executable instructions to activate the underlying operations include executable instructions that cause the computer to activate all underlying operations for the UDT.

11. The computer program of claim 7, where the executable instructions to activate the one or more operations include executable instructions that cause the computer to:
   accept an ALTER TYPE query including a system operators clause including an operator list including one or more operator elements, where each operator element corresponds to an underlying operation; and
   for each operator element listed in the operator list:
      activate the corresponding underlying operation for the UDT.

12. The computer program of claim 7, where one or more UDT columns are adapted to store UDT values, and where the executable instructions cause the computer to:
   accept a query including a query operator that takes one or more operands, where one or more of the operands are UDT columns; and
   determine whether the query operator is activated for the UDT of each UDT column, and if it is, perform the operation.

13. A database system including:
   a massively parallel processing system including:
   one or more nodes;
   a plurality of CPUs, each of the one or more nodes providing access to one or more CPUs;
   a plurality of data storage facilities each of the one or more CPUs providing access to one or more data storage facilities;
   a process for execution on the massively parallel processing system for controlling operations performed on a user-defined type (UDT) in the database system, where the UDT is derived from an underlying type having a set of underlying operations, the process including:

creating the UDT from the underlying type in the database system;

selectively activating one or more underlying operations for the UDT; and recording, in a data dictionary, the activated underlying operations for the UDT.

14. The database system of claim 13, where the UDT is a distinct data type.

15. The database system of claim 13, where creating the UDT includes:

accepting a CREATE TYPE query including a system operators clause including an operator list including one or more operator elements, where each operator element corresponds to an underlying operation;

and where activating the underlying operations includes:

for each operator element listed in the operator list:

activating the corresponding underlying operation for the UDT.

16. The database system of claim 15, where the operator list includes an ALL element, and where activating the underlying operations includes activating all underlying operations for the UDT.

17. The database system of claim 13, where activating the underlying operations includes:

accepting an ALTER TYPE query including a system operators clause including an operator list including one or more operator elements, where each operator element corresponds to an underlying operation; and for each operator element listed in the operator list:

activating the corresponding underlying operation for the UDT.

18. The database system of claim 13, where one or more UDT columns are adapted to store UDT values, the process including:

accepting a query including a query operator that takes one or more operands, where one or more of the operands are UDT columns; and determining whether the query operator is activated for the UDT of each UDT column, and if it is, performing the operation.

\* \* \* \* \*